April 26, 1932.                J. G. LINDEMAN                1,855,605
                              OFFSET DISK HARROW
                      Filed Oct. 21, 1929      3 Sheets-Sheet 2
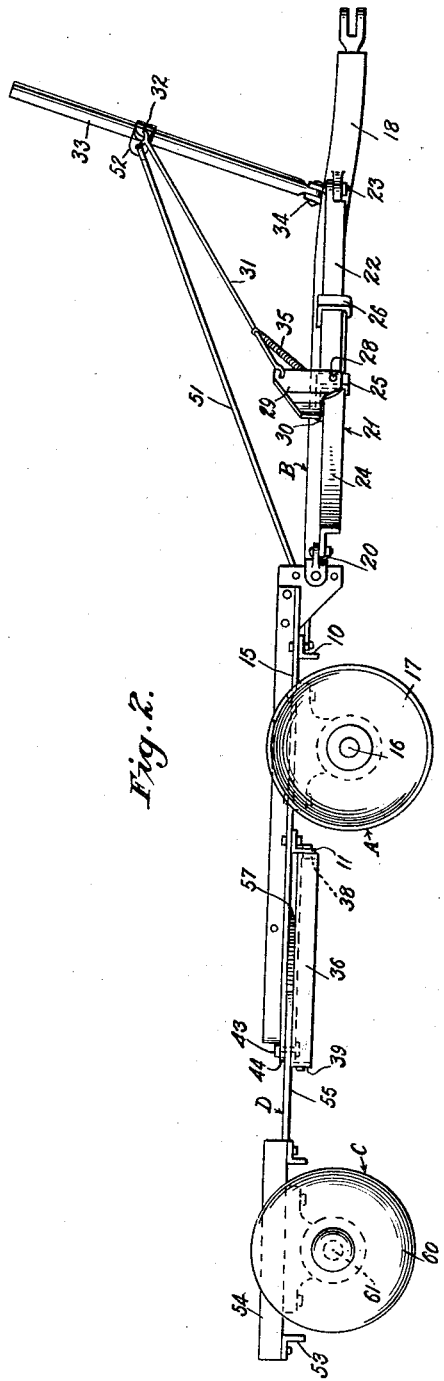
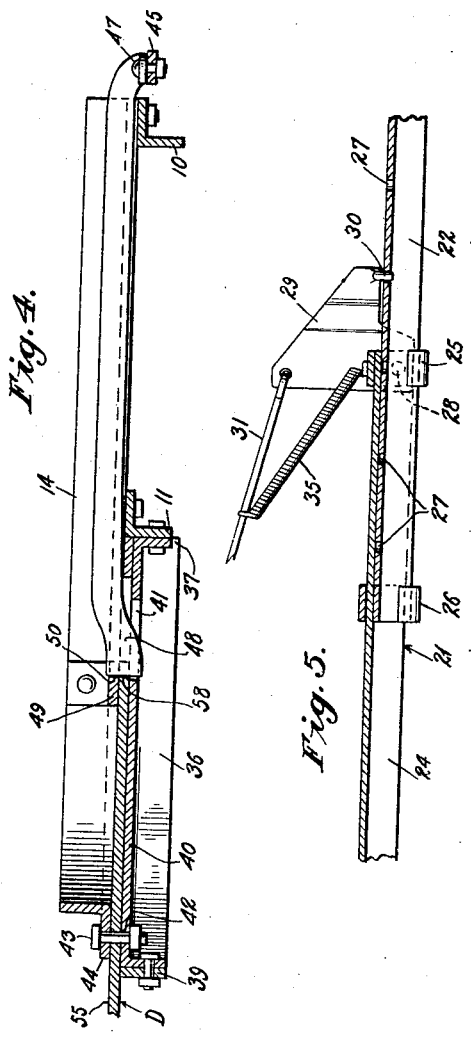
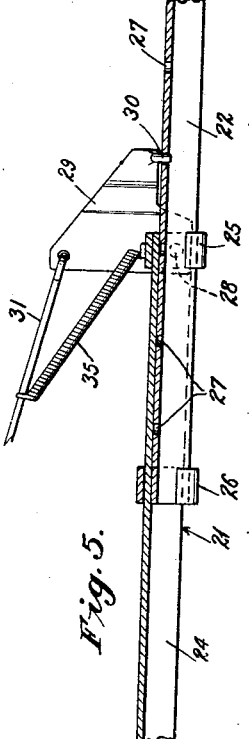
Inventor
J. G. Lindeman
By Bacon & Thomas
Attorneys April 26, 1932.  J. G. LINDEMAN  1,855,605
OFFSET DISK HARROW
Filed Oct. 21, 1929  3 Sheets-Sheet 3

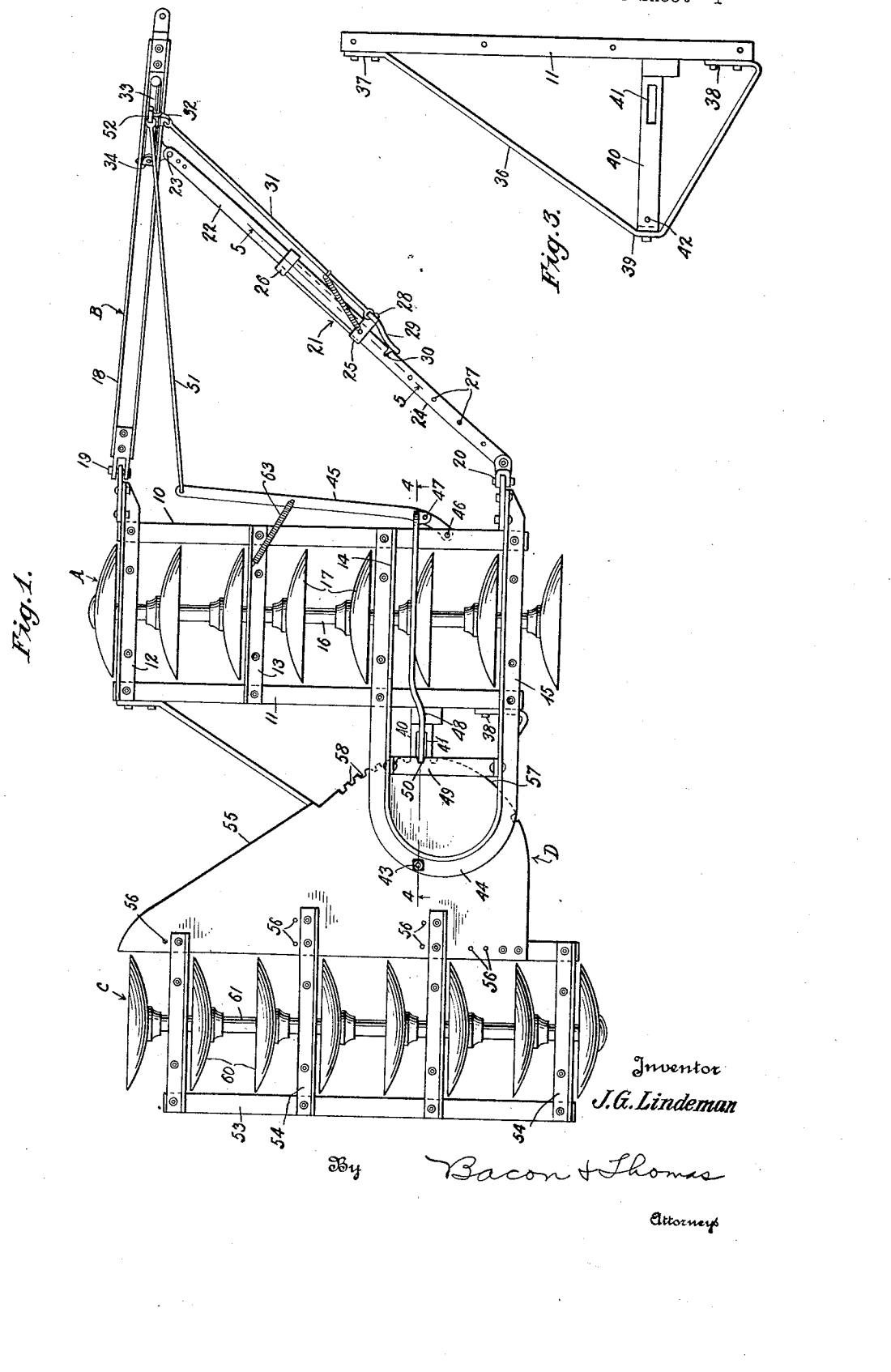

Inventor
J. G. Lindeman

By Bacon & Thomas
Attorneys

Patented Apr. 26, 1932

1,855,605

UNITED STATES PATENT OFFICE

JESSE G. LINDEMAN, OF YAKIMA, WASHINGTON

OFFSET DISK HARROW

Application filed October 21, 1929. Serial No. 401,167.

This invention relates to new and useful improvements in offset disk harrows.

The primary object of the invention is to provide an offset disk harrow which may be angled to permit either a right or left turn without danger of breaking the disks or without digging holes in the field or land being treated.

A further object of the invention is to provide an offset disk harrow which may be adjusted to permit any desired degree of offset or which may be adjusted so that the several gangs will trail directly behind the power plant employed for propelling the same.

A still further object of the invention is to provide an offset disk harrow having means for permitting angling of the gangs and additional means for offsetting the gangs to any desired extent with controlling mechanism for said means which may be actuated by the driver of a tractor or the like without necessitating leaving the seat of the said tractor, and more specifically wherein a single control lever is employed for operating the aforementioned adjusting means.

Another object of the invention is to provide a novel form of fifth wheel structure connecting the front and rear gangs with latching means for retaining the gangs angled, the said latching means being associated with the fifth wheel structure.

Other objects and advantages of the invention will be apparent during the course of the following description.

In the accompanying drawings forming a part of this specification, and in which like numerals are employed to designate like parts throughout the same,—

Figure 1 is a top plan view of the offset disk harrow embodying this invention.

Figure 2 is a side elevational view of the mechanism disclosed in Figure 1.

Figures 3, 4 and 5 are detail views disclosing certain portions of the adjusting mechanism incorporated in the offset disk harrow embodying this invention.

Figure 7:
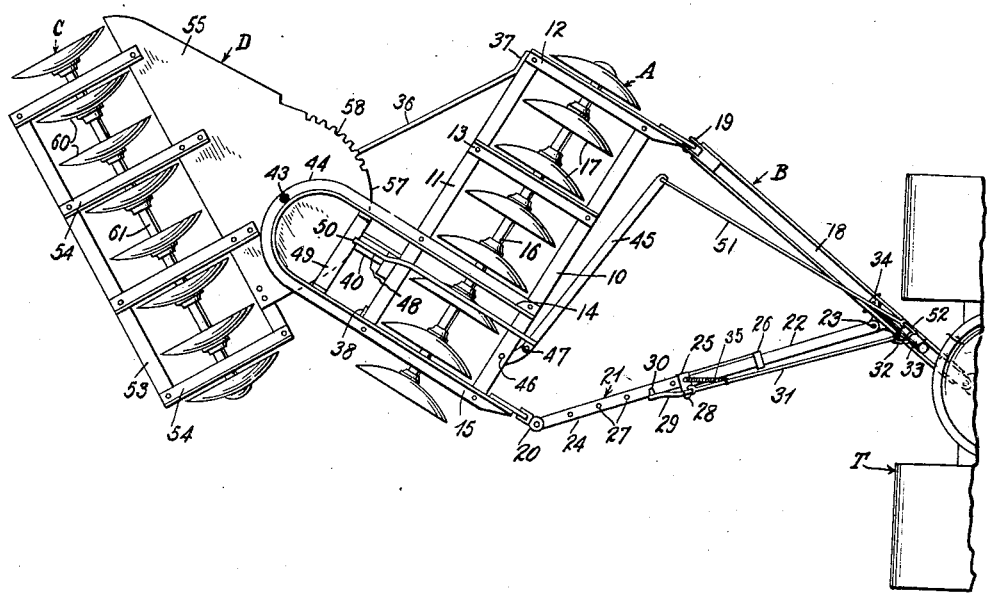

In the drawings, wherein, for the purpose of illustration, is shown a preferred embodiment of the invention, the character A designates in its entirety the front gang of disks. Suitably connected to this gang is the novel form of hitch B which includes offset adjustment mechanism. A rear gang C is connected to the front gang A by means of an angling mechanism designated in its entirety by the reference character D.

To more specifically describe the various detail features of construction, the front gang A includes a frame formed of front and rear parallel bars 10 and 11 respectively. Extending between these bars and functioning to connect and properly space the same, are the braces 12 and 13. These two braces are arranged on one side of the longitudinal center of the frame. The angle frame bars 10 and 11 are connected and braced on the other side of their longitudinal centers by means of an angle bar 14, which is bent into U-shape and has the end portions of its branches, as designated by the reference character 15, suitably bolted or riveted to the frame angles 10 and 11. The rearwardly projecting looped portion of the brace 14 performs a specific function which will be described at a later point.

Suitably connected to the bracing bars 12, 13 and 14, is a shaft 16 upon which the disks 17 are suitably mounted. The manner of mounting the disks 17 on the shaft 16 and the method of securing the said shaft to the front gang frame have not been disclosed in detail as these features of construction form no part of this invention.

The hitch B is made up of a draw-bar 18, pivoted at 19 in any desired manner to the frame of the front gang A. This pivotal connection must be of a character to permit both vertical and lateral pivotal movement of the draw-bar with respect to the frame. Pivotally connected at 20 to the remaining end of the front gang is an offset adjustment bar 21, which includes a front section 22, pivoted at 23 to the draw-bar 18 adjacent its outer end. The rear section 24 of the adjustment bar is connected at 20, as previously described, to the frame of the front gang. The front section 22 of the adjustment bar is formed with a strap or bracket 25, which encircles the rear section 24 and is slidable thereon. This rear section is formed with a strap or bracket 26 which encircles the front section 22 and is slidable thereon.

Figures 1 and 5 very clearly illustrate the rear section 24 as having formed in its horizontal flange a series of spaced apertures 27. The strap or bracket 25 has pivoted thereto, as at 28, a latch member 29 which preferably is of triangular formation. A depending projection or bolt 30 is formed on this latch plate 29 and is adapted to be selectively inserted in any one of the apertures 27. The upper angle of the plate 29 has pivotally connected thereto a rod 31 which extends forwardly of the hitch to be pivotally connected at 32 to a perpendicularly extending control lever 33. This control lever is mounted by means of a universal joint 34 upon the draw-bar 18. A tension spring 35 is connected at one end to the rod 31 at a distance from its pivotal connection with the latch plate 29, and is connected at its remaining end to the bracket or strap 25. The operation of this offset adjustment mechanism will be described in detail at a later point.

In Figure 3 the rear longitudinal frame bar 11 of the front gang A is illustrated as having rigidly secured thereto a bar 36. This bar 36 cooperates with the frame bar 11 to form a truss, the angularly bent ends 37 and 38 of the bar 36 being bolted or riveted to the frame bar 11. Extending between the apex 39 of the truss and the oppositely disposed portion of the frame bar 11 is a brace 40, which is slotted at 41, for a purpose to be described at a later point. An aperture 42 is formed in the brace 40 and receives a pivot bolt 43, see Figures 1 and 4, which also passes through an aperture formed in the looped portion 44 of the aforementioned U-shaped brace 14.

A lever 45 is pivoted at 46 to the front frame bar 10 of the front gang A. This lever has pivoted thereto, as at 47, a latch or bolt 48, which extends across the frame and has a downwardly and laterally offset end positioned to enter the slot 41 formed in the brace 40, as disclosed in Figures 3 and 4. This offset end is slidable within the slot 41 and cooperates with a transverse brace bar 49 connected at its opposite ends to the sides of the looped portion 44 formed as a part of the brace 14. This transverse bar 49 is provided with a notch 50 to receive the end edge of the latch 48.

The lever 45 has pivotally connected to its outer end a rod 51 which extends longitudinally of the harrow to be pivotally connected at 52 to the control lever 33, as best illustrated in Figure 2.

The rear gang C is provided with a frame which includes a rear angle bar 53 having connected thereto the rear ends of a plurality of transverse bracing bars 54. The front ends of most of these bracing members are connected to a plate 55 which is of substantially triangular formation and extends longitudinally of the frame. It will be noted that the plate 55 is provided with a plurality of sets of apertures 56 by means of which the said plate may be adjusted longitudinally of the remainder of the frame. The front edge of the plate 55 is rounded at 57 and this rounded portion is formed with a plurality of spaced notches 58.

Figure 4 clearly illustrates the plate 55 as having an aperture formed therein for the reception of the pivot bolt or pin 43. The said plate furthermore is illustrated as being interposed between the looped portion 44 of the brace 14 and the apex portion of the truss partially formed by the angularly bent bar 36. The notches 58 are then positioned in cooperative relation with respect to the latching end of the bolt 48.

The rear gang C is provided with a suitable number of disks 60 which are mounted upon a shaft 61 suitably connected to the transverse brace members 54.

Figure 6:
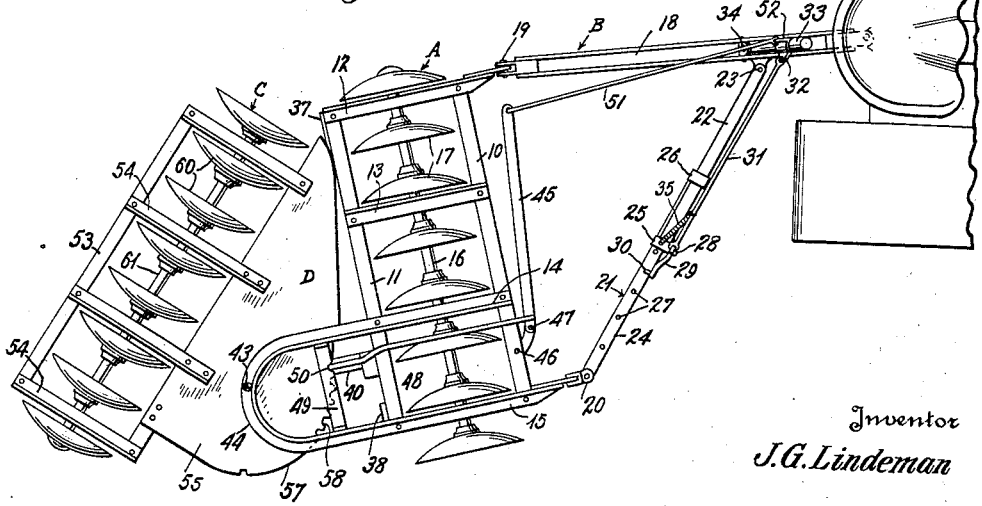
Figure 6 is a top plan view of this improved offset disk harrow angled for placing the front and rear gangs in proper work performing positions and for making a left turn; and, Figure 7 is a top plan view of the harrow angled for a right turn.

In operating an offset disk harrow of the type just described, the usual practice is to angle the front and rear gangs by a forward pull on the part of the tractor with the tractor travelling toward the left or making a left turn. To accomplish this angle adjustment, the operator rocks the control lever 33 longitudinally of the draw-bar 18 to cause the rod 51 to pivot the lever 45 against the tension of the spring 63. This movement of the lever 45 shifts the latch 48 longitudinally to disengage its end from the notches 58 formed in the plate 55. The forward movement of the tractor toward the left will cause the front and rear gangs to assume a proper angle with respect to each other, whereupon the lever 33 is moved into a vertical position for causing the latch 48 to engage the nearest notch 58. The tractor then may be moved forwardly and the two gangs will angle with respect to each other and will offset from the tractor as illustrated in Figure 6. With the gangs angled in this manner, the harrow may be turned to the left without any further adjustment. Should it become desirable to make a right hand turn with the harrow the operator should again pivot the lever 33 toward the tractor for withdrawing the latch 48 from the notch it then occupies. The tractor may be then driven to the right and the rear harrow will pivot with respect to the front harrow and will make the turn without digging any holes in the surface being treated or without placing any lateral strains or stresses upon the disks.

After the right hand turn has been made the gangs again may be angled so that they will assume the proper offset working condition.

It will be noted that the rear gang pivots upon the pin 43 and that the plate 55 cooperates with the bracing members 44 and 36 to form a novel fifth wheel structure. The latching or holding means for retaining the rear gang in any desired angle position is closely associated with this fifth wheel mechanism.

The normal position of the gangs during operation of the same is in an offset position with respect to the tractor. The degree of offset varies with different types of work and for this reason it is desirable to be able to vary the hitch B. This offset adjustment may be accomplished in the following manner.

The latch plate 29 first should be pivoted upon the bracket 25 by a longitudinal movement of the rod 31. This desired movement of the rod may be accomplished by rocking the control lever 33 laterally of the draw-bar 18. With the pin or bolt 30, formed as a part of the latch plate 29, removed from all of the apertures 27, the operator may drive the tractor either forwardly or rearwardly for slidably adjusting the sections 22 and 24 of the offset adjustment bar with respect to each other to lengthen or shorten the overall dimension of this bar. After the said adjustment bar has been lengthened or shortened to the desired extent, the control lever 33 should be rocked until it assumes a purely vertical position and the latch pin 30 will enter one of the apertures 27. The gangs then will assume the proper offset positions upon a forward movement of the harrow.

It will be noted that the gangs may be angled in either direction and/or offset to any desired extent by a manipulation of the single control lever 33, and that this lever is conveniently positioned to the driver's seat of the tractor T. The disk harrow, therefore, may be put through all of its paces without requiring the operator to leave the seat of the tractor.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described my invention, what I claim is:

1. An offset disk harrow of the type described comprising a pair of gangs, means for pivotally connecting the gangs, and latching means concentrically positioned relative the aforesaid means for retaining the gangs angled with respect to each other.

2. An offset disk harrow of the type described comprising a pair of tandem gangs, means for pivotally connecting the gangs to permit them to freely angle in either direction, and latching means for retaining the gangs angled to any desired extent in one of said directions.

3. An offset disk harrow of the type described comprising a pair of tandem gangs, a fifth wheel structure pivotally connecting said gangs to permit them to angle to either side of a parallel position, and latching means associated with said fifth wheel structure.

4. An offset disk harrow of the type described comprising a pair of tandem gangs, a pair of superimposed frame members extending rearwardly of the front gang, and a plate carried by the rear gang pivotally connected to and positioned between said superimposed frame members at all pivoted positions of the gangs.

5. An offset disk harrow of the type described comprising front and rear gangs, means for pivotally connecting said gangs to permit them to angle in either direction, said means including a plate carried by the rear gang and pivoted to a frame extension on the front gang, said plate having a series of notches formed in one edge thereof, and means carried by the front gang for engaging any one of said notches to retain the gangs angled in one direction to any desired extent.

6. An offset disk harrow of the type described comprising a pair of pivotally connected gangs, means for retaining said gangs pivotally adjusted with respect to each other, a hitch connected to one of said gangs, means for varying the angle of draft of said hitch, and a common control member for actuating the aforementioned means.

7. An offset disk harrow of the type described comprising front and rear gangs, means for pivotally connecting said gangs, a latch mechanism for retaining the gangs in a pivoted condition with respect to each other, a hitch connected to one of said gangs and adjustable to vary the angle of draft, latching means for retaining said hitch in any desired adjusted condition, and a single control lever for operating both of said latching means.

8. An offset disk harrow of the type described comprising a pair of gangs, means for pivotally connecting said gangs, and a hitch connected to one of said gangs, said hitch including a draw bar and an offset adjustment bar, and means for controlling the adjustment of the latter bar which includes a latching member pivoted upon the adjustment bar.

9. An offset disk harrow of the type described comprising front and rear gangs, means for pivotally connecting said gangs and a hitch connected to the front gang, said hitch including a draw bar pivoted to the gang and an extensible adjustment bar pivoted to the gang and to the draw bar, a lever pivotally mounted on the draw bar, and a latch for controlling the adjustment of the extensible bar operatively connected to said lever.

10. An offset disk harrow of the type described comprising front and rear gangs, a triangular plate carried by one of said gangs and projecting toward the remaining gang, a support carried by said remaining gang, a pivot pin extending through said support and the plate, and means associated with said plate for retaining the same in any desired pivoted position with respect to said support.

11. An offset disk harrow of the type described comprising a pair of tandem gangs, a frame extension carried by the front gang, a longitudinally extending plate adjustably connected to the rear gang, and means for horizontally pivotally connecting the plate to said frame extension with the parts in overlapped relation to prevent relative vertical pivoting of the gangs at all times.

12. An offset disk harrow of the type described comprising a pair of tandem gangs, a frame extension carried by the front gang, a longitudinally extending plate adjustably connected to the rear gang, means for pivotally connecting the plate to said frame extension, said plate having a series of notches in one edge thereof and a latch carried by the front gang adapted to selectively engage one of said notches.

13. An offset disk harrow of the type described, comprising a pair of tandem gangs, means for pivotally connecting the gangs to permit them to angle either to the right or to the left, and means for retaining the gangs in angled positions at either side of their parallel position.

14. An offset disk harrow of the type described, comprising a pair of pivotally connected tandem gangs, a hitch connected to the front gang, and means for varying the angle of draft of said hitch, said means comprising a draw-bar non-adjustable in length connected to one side of the gang, an adjustable bar connected to the other side of the gang, and to the draw-bar and including slidably connected sections, means for retaining said sections against relative sliding movement, a control lever supported by the draw-bar, and means operatively connecting the lever to the retaining means.

15. An offset disk harrow of the type described, comprising a pair of pivotally connected tandem gangs, a hitch connected to the front gang, and means for varying the angle of draft of said hitch, said means comprising a draw-bar connected to one side of the gang, an adjustable bar connected to the other side of the gang and to the draw-bar and including slidably connected sections, means pivotally mounted on one of said sections and engageable with the other section for retaining said sections against relative sliding movement, a control lever supported by the draw-bar, and means operatively connecting the lever to the pivotal retaining means.

16. An offset disk harrow of the type described, comprising a pair of pivotally connected tandem gangs, a hitch connected to the front gang, and means for varying the angle of draft of said hitch, said means comprising a draw-bar connected to one side of the gang, an adjustable bar connected to the other side of the gang and to the draw-bar and including slidably connected sections, and means for retaining said sections against relative sliding movement; means for retaining said gangs pivotally adjusted with respect to each other, and a common control for actuating the retaining means for the slidable bar sections and the pivotal gangs.

17. An offset disk harrow of the type described, comprising a pair of pivotally connected tandem gangs, a hitch connected to the front gang, and means for varying the angle of draft of said hitch, said means comprising a draw-bar connected to one side of the gang, an adjustable bar connected to the other side of the gang and to the draw-bar and including slidably connected sections, and means pivotally mounted on one of said sections and engageable with the other section for retaining said sections against relative sliding movement; means for retaining said gangs pivotally adjusted with respect to each other, and a common control for actuating the retaining means for the pivotal gangs and the slidable bar sections.

18. An offset harrow frame including a rear frame bar, a plurality of braces connected to the frame bar, and a front frame member consisting of a plate formed with a straight edge portion to which the braces are connected and a forwardly projecting portion acting as a hitch for the gang.

19. An offset harrow frame including a rear frame member, a front frame member consisting of a plate having one edge portion substantially parallel with the rear frame member and a forwardly projecting hitch portion having a pivot pin bearing positioned to one side of the fore and aft axis of the frame, and means for connecting the said frame members.

20. An offset harrow frame including a rear frame member, a front frame member consisting of a plate having one edge portion substantially parallel with the rear frame member and a forwardly projecting hitch portion having a pivot pin bearing positioned to one side of the fore and aft axis of the frame, and braces fixed to the rear frame member and connected to the said edge portion of the front frame member to permit adjustment of the latter member to vary the position of the pivot pin bearing.

21. An offset disk harrow of the type described, comprising a pair of tandem gangs, a pair of super-imposed members projecting from one of said gangs between its ends and toward the second gang, a plate projecting from the second gang toward the first gang and positioned between said super-imposed members, the plate and super-imposed members being overlapped longitudinally and transversely of the harrow to prevent the gangs from twisting or rocking with respect to each other about horizontal axes in all relative positions of the gangs, and a pivot element passing through said super-imposed members and said plate for pivotally connecting the gangs to permit turning in both directions.

In testimony whereof I affix my signature.

JESSE G. LINDEMAN.